(12) United States Patent
Humer et al.

(10) Patent No.: US 11,021,090 B2
(45) Date of Patent: Jun. 1, 2021

(54) SEAT ASSEMBLY WITH LEG SUPPORT

(71) Applicant: Lear Corporation, Southfield, MI (US)

(72) Inventors: Mladen Humer, West Bloomfield, MI (US); David Gallagher, Sterling Heights, MI (US); Francesco Migneco, Salene, MI (US); Walter T. Cichocki, Brighton Township, MI (US); Ted Smith, Waterford, MI (US)

(73) Assignee: LEAR CORPORATION, Southfield, MI (US)

(*) Notice: Subject to any disclaimer, the term of this patent is extended or adjusted under 35 U.S.C. 154(b) by 0 days.

(21) Appl. No.: 16/585,996

(22) Filed: Sep. 27, 2019

(65) Prior Publication Data

US 2021/0094454 A1 Apr. 1, 2021

(51) Int. Cl.
| | |
|---|---|
| *B60N 2/42* | (2006.01) |
| *B60N 2/427* | (2006.01) |
| *B60N 2/62* | (2006.01) |
| *B60N 2/90* | (2018.01) |
| *B60N 2/02* | (2006.01) |
| *A47C 7/50* | (2006.01) |
| *A47C 7/14* | (2006.01) |

(52) U.S. Cl.
CPC ............. *B60N 2/914* (2018.02); *A47C 7/142* (2018.08); *A47C 7/503* (2013.01); *A47C 7/506* (2013.01); *B60N 2/0224* (2013.01); *B60N 2/0284* (2013.01); *B60N 2/62* (2013.01)

(58) Field of Classification Search
CPC ...... B60N 2/0224; B60N 2/0284; B60N 2/62; B60N 2/914

USPC .............................. 297/216.1, 284.11, 452.41
See application file for complete search history.

(56) References Cited

U.S. PATENT DOCUMENTS

| | | | | |
|---|---|---|---|---|
| 3,608,961 A | * | 9/1971 | Von Heck | ................ A47C 7/02 297/284.1 |
| 3,730,588 A | * | 5/1973 | Braun | .................. A47C 27/088 297/284.1 |
| 4,493,877 A | * | 1/1985 | Burnett | ................ A47C 31/126 428/542.8 |
| 4,589,695 A | * | 5/1986 | Isono | ..................... A47C 7/467 297/284.11 X |
| 4,615,563 A | * | 10/1986 | Kobayashi | ............. A47C 7/467 297/284.11 X |

(Continued)

FOREIGN PATENT DOCUMENTS

| | | |
|---|---|---|
| DE | 1973915 B4 | 6/2007 |
| DE | 19735915 B4 | 6/2007 |

(Continued)

*Primary Examiner* — Rodney B White
(74) *Attorney, Agent, or Firm* — Brooks Kushman P.C.

(57) ABSTRACT

A seat assembly is provided having a seat bottom and at least one bladder mounted to the seat bottom adjacent a forward surface and filled with a compressible material. The bladder is moveable between a storage position and at least one leg-support position. A valve is in fluid communication with the at least one bladder. A vacuum pump in fluid communication with the valve. The compressible material is compressed under vacuum pressure generated by the pump when the valve is closed in the storage position. The compressible material is expanded when the valve is open to move the at least one bladder to the leg-support position.

19 Claims, 4 Drawing Sheets

(56) References Cited

U.S. PATENT DOCUMENTS

| | | | | |
|---|---|---|---|---|
| 4,629,248 A * | 12/1986 | Mawbey | ............... | B60N 2/914 |
| | | | | 297/284.11 |
| 4,629,253 A * | 12/1986 | Williams | ............... | B60N 2/00 |
| | | | | 297/452.41 X |
| 4,722,550 A * | 2/1988 | Imaoka | ............... | A47C 7/467 |
| | | | | 280/727 |
| 4,775,185 A * | 10/1988 | Scholin | ............... | B60N 2/62 |
| | | | | 297/284.11 |
| 4,796,955 A * | 1/1989 | Williams | ............... | B60N 2/914 |
| | | | | 297/452.41 X |
| 5,176,424 A * | 1/1993 | Tobita | ............... | A47C 27/082 |
| | | | | 297/284.1 |
| 5,186,494 A * | 2/1993 | Shimose | ............... | B60N 2/4221 |
| | | | | 280/806 |
| 5,607,204 A * | 3/1997 | Gryp | ............... | B60N 2/0715 |
| | | | | 297/284.11 |
| 5,658,050 A * | 8/1997 | Lorbiecki | ............... | B62J 1/12 |
| | | | | 297/452.41 |
| 6,036,266 A * | 3/2000 | Massara | ............... | B60N 2/10 |
| | | | | 297/328 |
| 6,386,633 B1 * | 5/2002 | Newton | ............... | B60N 2/62 |
| | | | | 297/284.11 X |
| 6,402,245 B1 * | 6/2002 | Newton | ............... | B60N 2/62 |
| | | | | 297/284.11 |
| 6,851,755 B2 * | 2/2005 | Dinkel | ............... | A47C 4/54 |
| | | | | 297/452.41 X |
| 7,726,739 B2 * | 6/2010 | Wain | ............... | B60N 2/68 |
| | | | | 297/284.11 X |
| 7,758,121 B2 * | 7/2010 | Browne | ............... | B60R 7/043 |
| | | | | 297/284.11 |
| 8,128,167 B2 * | 3/2012 | Zhong | ............... | B60N 2/0284 |
| | | | | 297/284.11 |
| 8,136,883 B2 * | 3/2012 | Rehfuss | ............... | B60N 2/986 |
| | | | | 297/284.9 |
| 8,702,120 B2 * | 4/2014 | Kalisz | ............... | B60N 2/986 |
| | | | | 297/216.1 X |
| 9,090,185 B2 * | 7/2015 | McMillen | ............... | B60N 2/853 |
| 9,321,373 B2 * | 4/2016 | Sakata | ............... | B60N 2/914 |
| 9,393,891 B2 * | 7/2016 | Beier | ............... | B60N 2/7017 |
| 9,457,751 B1 | 10/2016 | Stancato et al. | | |
| 9,527,408 B2 * | 12/2016 | Stancato | ............... | B60N 2/4279 |
| 9,527,417 B2 * | 12/2016 | Dry | ............... | B60N 2/665 |
| 9,527,418 B2 * | 12/2016 | Sachs | ............... | B60N 2/995 |
| 9,550,439 B2 * | 1/2017 | Dry | ............... | B60N 2/665 |
| 9,610,872 B2 * | 4/2017 | Dry | ............... | B60N 2/36 |
| 9,937,826 B2 * | 4/2018 | Dry | ............... | B60N 2/64 |
| 9,981,588 B2 * | 5/2018 | Dry | ............... | B60N 2/914 |
| 9,994,135 B2 | 6/2018 | Line et al. | | |
| 10,045,623 B2 * | 8/2018 | Bortolon | ............... | B62J 1/08 |
| 10,065,534 B1 * | 9/2018 | Line | ............... | B60N 2/62 |
| 2008/0191531 A1 * | 8/2008 | Hoffmann | ............... | B60N 2/4495 |
| | | | | 297/284.1 |
| 2009/0045614 A1 | 2/2009 | Katsuda | | |
| 2015/0210192 A1 * | 7/2015 | Benson | ............... | B60N 2/525 |
| | | | | 297/452.41 X |
| 2016/0347206 A1 * | 12/2016 | Line | ............... | B60N 2/914 |
| 2017/0043690 A1 * | 2/2017 | Dry | ............... | B60N 2/914 |
| 2018/0018625 A1 | 1/2018 | Spruell et al. | | |
| 2019/0039480 A1 | 2/2019 | Hunt | | |
| 2020/0238874 A1 * | 7/2020 | Mazzucchelli | ............... | B60N 2/914 |

FOREIGN PATENT DOCUMENTS

| | | | | |
|---|---|---|---|---|
| JP | 59075842 A * | 4/1984 | ............ | B60N 2/62 |
| JP | 3904664 B2 | 4/2007 | | |
| KR | 20050008911 A | 1/2005 | | |
| KR | 101746450 B1 | 6/2017 | | |

* cited by examiner

SEAT ASSEMBLY WITH LEG SUPPORT

TECHNICAL FIELD

The present application relates to a seat assembly having adjustable leg support.

BACKGROUND

An adjustable seat assembly is disclosed in U.S. Patent Publication No. 2018/018625 by Lear Corporation.

SUMMARY

According to at least one embodiment, a seat assembly is provided having a seat bottom and at least one bladder mounted to the seat bottom adjacent a forward surface and filled with a compressible material. The bladder is moveable between a storage position and at least one leg-support position. A valve is in fluid communication with the at least one bladder. A vacuum pump in fluid communication with the valve. The compressible material is compressed under vacuum pressure generated by the pump when the valve is closed in the storage position. The compressible material is expanded when the valve is open to move the at least one bladder to the leg-support position.

In another embodiment, the compressible material is a compressible foam. A first bladder and a second bladder are provided in the seat assembly. The foam in the first bladder is expanded to a first leg-support position, and the foam in the second bladder is expanded to a second leg-support position.

In another embodiment, a right bladder and a left bladder are provided. The right bladder and left bladder are independently operable and adapted to provide support for a right occupant leg and a left occupant leg independently.

In another embodiment, the seat bottom has a seat frame. The first and second bladder arrays are positioned between a front surface of the seat frame and an extendable support surface.

In another embodiment, the first and second plurality of bladders are each arranged to expand angularly and wherein the first bladder array expands to move the support surface at a first angle relative to the front surface of the seat frame, and wherein the second bladder array expands to move the support surface to a second angle relative to the front surface of the seat frame.

In another embodiment, the adjustable leg-support assembly comprises a right leg-support assembly and a left leg-support assembly, wherein the right leg-support assembly is adjustable independent of the left leg-support assembly.

In another embodiment, the support surface defines a forward surface of the seat bottom when the adjustable leg-support assembly is in a storage position. An angle between a seating surface and the support surface varies as the first and second bladder arrays are expanded.

In another embodiment, as the angle between the seating surface and the support surface varies, at least one of a seat bottom height or a seat bottom forward extension increases.

In another embodiment, the adjustable leg-support assembly further comprises an actuator in communication with the adjustable leg-support assembly to expand the first and second bladder arrays.

In another embodiment, the seat assembly has a controller in communication with the actuator. The controller is programmed to receive an impact signal indicating a potential impact. The controller commands the actuator to expand the one of the first and second bladder arrays to at least one of the first and second leg-support positions based on the impact signal.

In another embodiment, the actuator has a valve assembly configured to open to atmosphere and expand a vacuum compressed foam disposed in the bladders when the actuator is activated.

In another embodiment, the actuator comprises a pump configured to inflate the bladders with air when the actuator is activated.

According to at least one embodiment method is provided that provides a plurality of bladders each filled with a compressible foam and mounted along a forward portion of a seat bottom. An impact signal is received indicative of a potential impact. An actuator is commanded to expand the foam in a first combination of the plurality of bladders to a first leg-support position if the impact signal indicates a front impact. The actuator is commanded to expand the foam in a second combination of the plurality of bladders to a second leg-support position if the impact signal indicates a rear impact.

In another embodiment, the valve is commanded comprises to open to the atmosphere and expand the foam compressed under vacuum.

In another embodiment, a seating position of the occupant is detected. It is determined whether the occupant seating position is correct for the potential impact. If the occupant seating position is not correct, the actuator is commanded to expand the foam in one of the first and second combinations.

In another embodiment, a seating position of the occupant is detected. An actuator is commanded to expand the foam in a least the first combination to the first leg-support position adapted to bend the occupant's knees based on the detected seating position if the impact signal indicates front impact. If the impact signal indicates the rear impact, the actuator to expand the foam in a least the second combination of bladders to the second leg-support position adapted to straighten the occupant's knees based on the detected seating position.

In another embodiment, the bladders are deflated with a vacuum pump if a front or rear impact does not occur.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
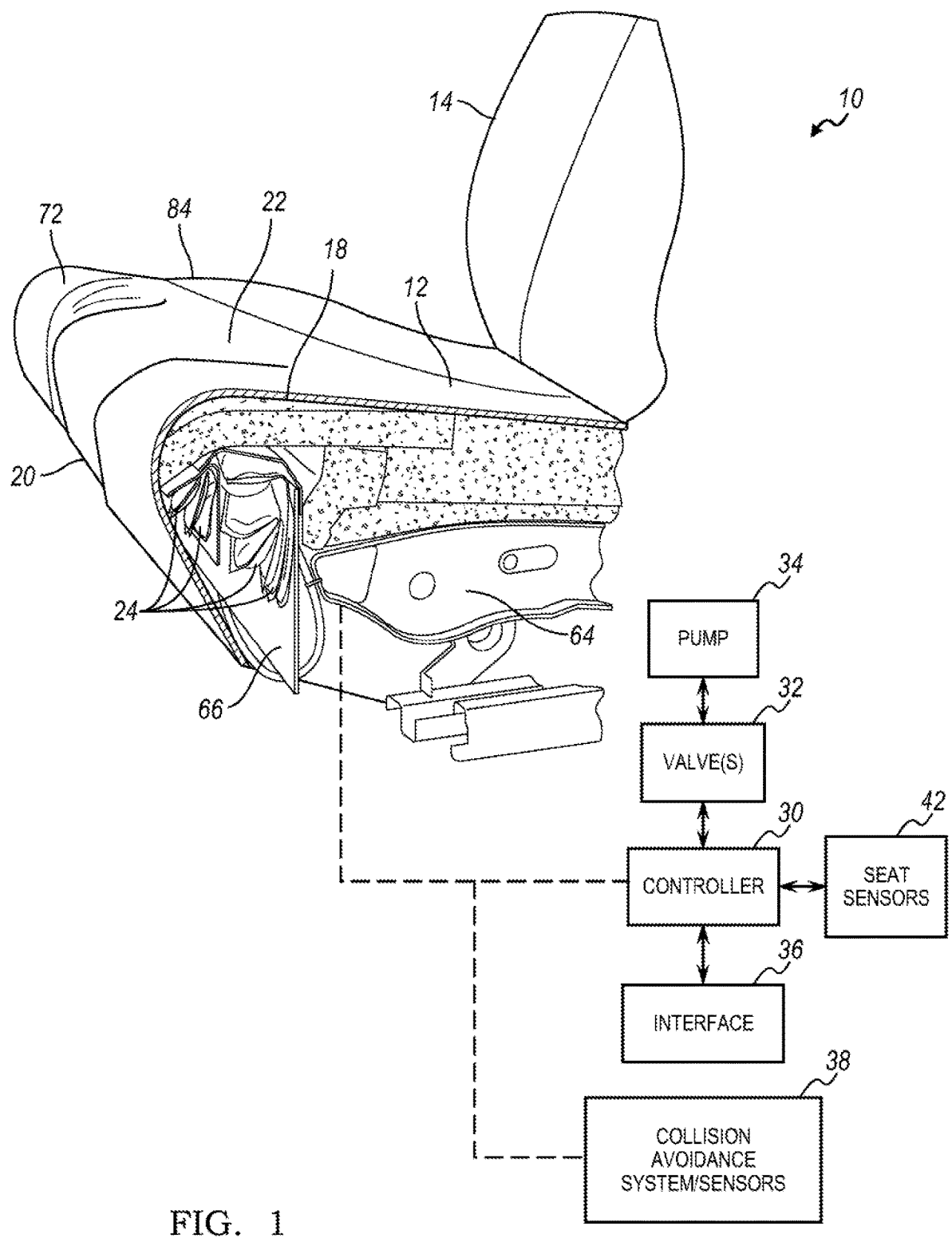
FIG. 1 illustrates a seat assembly having a leg-support assembly according to one embodiment of the present disclosure.

FIG. 1 illustrates a seat assembly 10 according to an embodiment. The seat assembly 10 may be utilized as a vehicle seat assembly 10 for seating in a vehicle, such as an automobile, an aircraft, a watercraft, or the like. Of course, the seat assembly 10 may be utilized in any seating environment that may benefit from an adjustable seat assembly 10.

The seat assembly 10 includes a seat bottom 12, which may be adapted to be mounted for adjustable translation in a fore and aft direction and in an up and down direction of a vehicle. The seat assembly 10 includes a seat back 14, which may be pivotally connected to the seat bottom 12 to extend generally upright relative to the seat bottom 12 for pivotal adjustment relative to the seat bottom 12. A head restraint 16 may also be mounted for adjustable translation to the seat back 14. The seat bottom 12 includes a seating surface 18. The seating surface 18 may include pair of side bolster regions laterally spaced about a central seating surface.

The seat bottom 12 has a leg-support assembly 20 mounted adjacent a forward surface 22 of the seat bottom 12 that is moveable between a stored position and at least one leg-support position to provide leg support to the seated occupant. The leg-support assembly 20 has at least one bladder 24 that expands to move the leg-support assembly 20 to the support position.

The leg-support assembly 20 also includes a controller 30, a valve 32 in fluid communication with the bladder 24 and a pump 34 in fluid communication with the valve 32. The controller 30 regulates air into and out of the leg-support assembly 20 by controlling whether the valve 32 is open or closed and/or turning the pump 34 on or off. The controller 30, valve 32 and pump 34 may be installed in the seat back 14, or installed under the seat, or anywhere suitable in the vehicle.

The controller 30 may communicate with an interface 36. The interface 36 may allow the occupant to adjust the leg-support assembly 20 for desired comfort and support. The interface 36 may be integrated into the vehicle, such as an instrument panel display that is in suitable wired or wireless communication with the controller 30. The interface may be remote, such as a smart device including phones, tablets and the like. The interface 36 may be a remote interface such as a smart device application. The remote interface may permit a user to transport settings to each vehicle, such as personal passenger vehicles, airline seating, rental cars, and the like.

Figure 2:
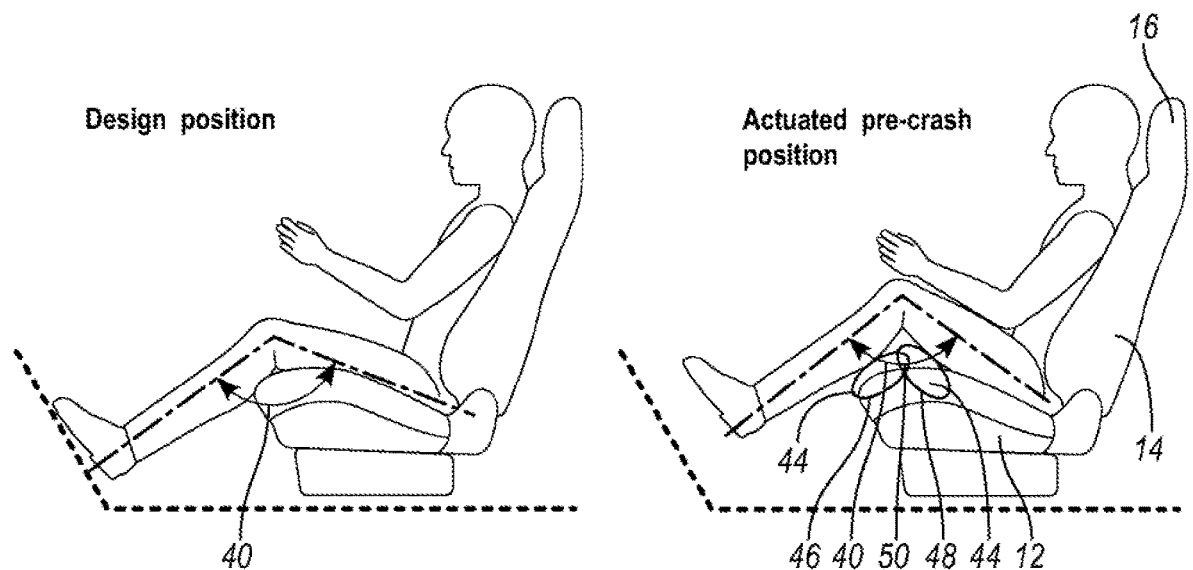
FIG. 2 shows a schematic illustration of a seat assembly having the leg-support assembly of FIG. 1 moving from a design position to a pre-crash position.

The leg-support assembly 20 may improve an occupant seating position by providing an active support to the occupant and moves the occupant's legs to a position that improves occupant kinematics during a crash. For example, as shown in FIG. 2, in advance of a frontal crash, the leg-support assembly 20 may move to a first leg-support position where the front of the occupant's thighs are raised to reduce femur-tibia (thigh-shin) angle 40. In this front-impact support position, the occupant's legs are bent at the knees to prevent compressive "knee-lock" and potential injury caused if the occupant's feet contact the front footwell, floor-pan or another structure in front of the occupant.

Figure 4:
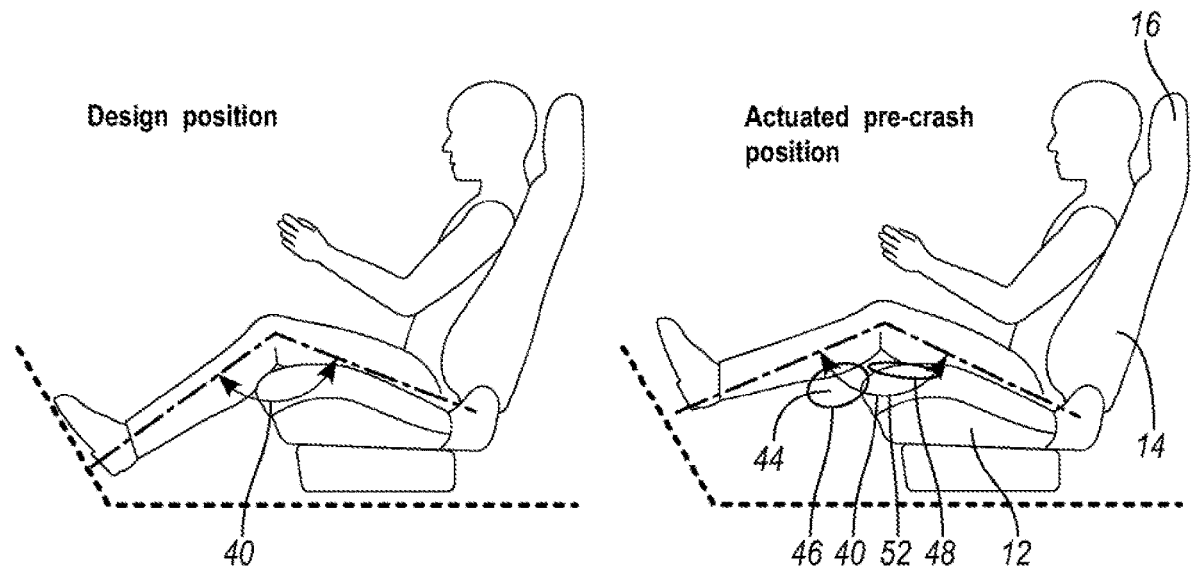
FIG. 4 shows a schematic illustration of a seat assembly having the leg-support assembly of FIG. 1 moving from a design position to a pre-crash position.

In another example shown in FIG. 4, the leg-support assembly 20 may move to a second leg-support position in advance of a rear crash. In the second leg-support position, the occupant's shins are raised to increase femur-tibia (thigh-shin) angle 40. The occupant's legs are straightened to facilitate pelvis penetration into seat back 14. In this rear-impact support position, the occupant's shins are less likely to impact the front frame of seat bottom 12, thereby reducing the chance of injury.

The controller 30 receives an impact signal indicative of a potential impact. The signal may be provided by vehicle sensors or systems such as collision avoidance systems 38 having lidar, camera or other vehicle collisions sensors and detection systems. If the impact signal indicates a forward impact, the controller 30 commands an actuator move the leg-support assembly 20 to the first leg-support position, like in FIG. 2. If the impact signal indicates a rear impact, the controller 30 commands the actuator to move the leg-support assembly 20 to the second leg-support position, like in FIG. 4.

The controller 30 may also detect a seating position of the occupant. The seat assembly 10 may include seat sensors or be in communication with cameras or other occupant detection systems. The controller 30 receives a seating position signal from the occupant detection system 42. The controller 30 determines if the occupant seating position is correct for the potential impact, whether frontal or rear impact. For example, the controller 30 may determine if the occupant's legs are straight or bent and other positioning within the seat. The controller 30 may also determine the position of the occupant relative to the pedals or steering wheel or other nearby structures. If the occupant seating position is not correct, the controller 30 commands the actuator to move the leg-support assembly 20 to at least one of the leg-support positions.

In preparation for a crash, the bladders 24 require quick active pre-crash actuation that expands or inflates the bladders to one of the leg-support positions in approximately 0.6-1.2 seconds. In another example, the actuation time may be 0.6-1.8 seconds. In one embodiment, the leg-support assembly 20 may include a pneumatic reservoir to inflate the required bladders quickly. In another embodiment, the bladder 24 is filled with a compressible material 44 that allows the bladders to rapidly expand from a compressed configuration to an expanded configuration. For example, the compressible material 44 may be a plastic wool, plastic mesh or foam, or other suitable compressible material.

In one embodiment, the compressible material may be a compressible foam 44. The compressible foam 44 may be an open-cell foam. In a storage position, the foam 44 is compressed under vacuum pressure generated by the pump 34 and the valve 32 is closed. To quickly expand the bladder 24 to one of the leg-support positions, the valve 32 is opened and the vacuum-compressed foam 44 quickly expands to move the bladder to the leg-support position. The foam 44 may be compressible to a generally 'solid height' by the vacuum pump by vacuum pressure. For example, the foam may be compressible to the solid height by the vacuum pump 34 under approximately −0.5 psi of vacuum pressure, or enough vacuum pressure to fully compress the material. The valve 32 then vents the low-pressure in the bladder 24 filled with foam 44 to atmosphere to quickly expand the bladders 24 as the vacuum is released.

As schematically shown in FIG. 2 and FIG. 4, the leg-support assembly 20 has a first bladder 46 and a second bladder 48. In a preparation for a rear crash, like in FIG. 4, the foam 44 in the first bladder 46 may expanded to the first leg-support position. As shown in FIG. 2, in preparation for a front crash, the foam 44 in the second bladder 48 is also expanded to the second leg-support position. If a crash does not occur, the first and/or second bladders 46, 48 may be compressed and returned to the storage positions by using the vacuum pump 34 evacuate air from the bladders 46, 48 and compress the foam 44.

In another embodiment, the leg-support assembly 20 may include a plurality of bladders, where different combinations of bladders may be expanded or inflated to different leg-support positions. For example, in preparation for a front crash like in in FIG. 2, a first combination of the plurality of bladders may expand to the first leg-support position that moves the occupant's legs to a first angle 50. In a preparation for a rear crash like in FIG. 4, a second combination of the plurality of bladders may expand to the second leg-support position that moves the occupant's legs to a second angle 52.

Figure 6:
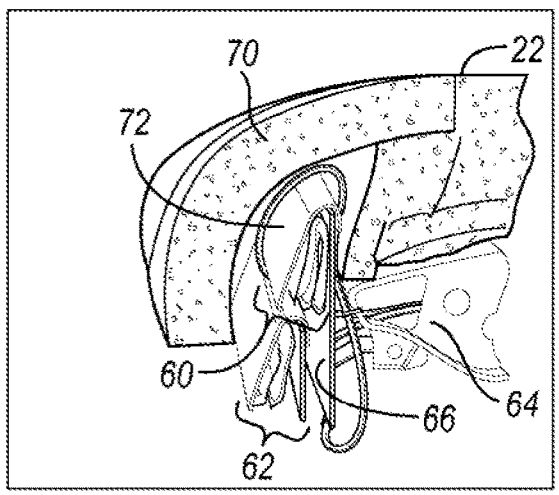
FIG. 6 illustrates the seat assembly of FIG. 1 with the trim cover removed to show the leg-support assembly in more detail; the leg-support assembly is illustrated in a stored position.
Figure 7:
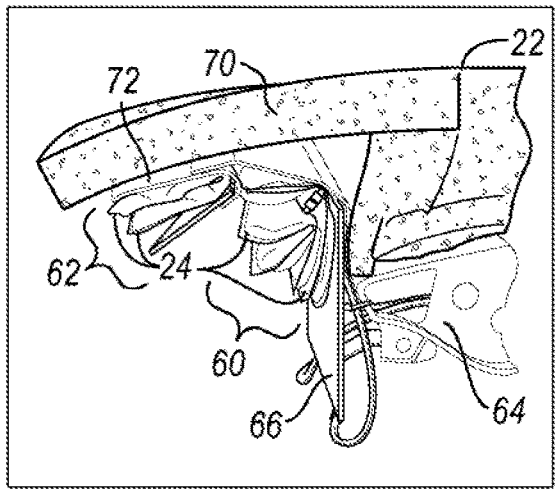
FIG. 7 illustrates the seat assembly of FIG. 1 with the trim cover removed and the leg-support assembly illustrated in a first support position.
Figure 8:
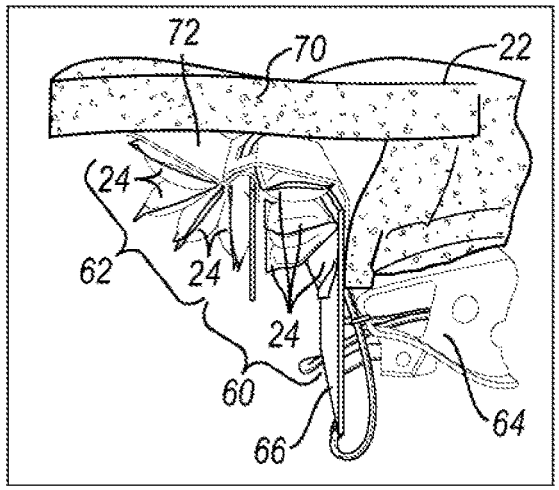
FIG. 8 illustrates the seat assembly of FIG. 1 with the trim cover removed and the leg-support assembly illustrated in a second support position.

FIGS. 6-8 illustrate the adjustable leg-support assembly 20 in more detail. The adjustable leg-support assembly 20 has a plurality of bladders 24 arranged in a first bladder array 60 and a second bladder array 62. The first and second bladder arrays 60, 62 are positioned between a front surface 66 of the seat frame 64 and an extendable support surface 72.

In the embodiment shown, the plurality of bladders 24 in each of the first and second bladder arrays 60, 62 are positioned generally radially, or at an angle relative to each other. When the bladders 24 expand, each array expands angularly. Of course, the bladders 24 in each array may be positioned in a different orientation, such as a linear array or other configuration to provide various leg-support configurations as each array 60, 62 expands.

FIG. 6 shows the first and second array 60, 62 where the bladders are compressed and leg-support assembly 20 is in a storage position. In this storage position, the leg-support assembly 20 is folded adjacent the front surface 66 of the seat frame 64. A cushion layer 70 may also fold over a support surface 72 of the leg-support assembly 20. The support surface 72 may be generally rigid and formed of metal similar to the seat frame 64. In another embodiment, the support surface may be formed of plastic or other material. The cushion layer 70 may be formed of foam or padding to provide cushioning and comfort over the support surface 72.

FIGS. 7-8 show the first and second arrays 60, 62 expanding and unfolding to form a leg-support surface 72 from the seating surface 18 without any opening or gaps between the seating surface 18 and leg-support surface 72 so that the seating surface and leg-support surface 72 form a continuous contoured surface. As further illustrated in FIGS. 7-8 an angle between a seating surface 18 and the support surface 72 varies as the first and second bladder arrays 60, 62 are expanded. As the angle between the seating surface 18 and the support surface 72 varies, a height increases of the seating surface 18 along the forward portion 22 may increase. Similarly, a forward extension of the seat bottom 12 may increase in the forward direction.

In FIG. 7, the first bladder array 60 expands to move the support surface 72 at a first angle relative to the front surface 66 of the seat frame 64, or a first leg-support position. In FIG. 8 the second bladder array 62 expands to move the support surface to a second angle relative to the front surface 66 of the seat frame 64, or a second leg-support position.

As shown, each of the first and second arrays may have four bladders 24. However, any number of bladders may be used. Further, while FIGS. 7-8 shows all of the bladders 24 in the first and second arrays 60, 62 expanded in the respective Figures, any combination of bladders may be expanded to define the first and second leg-support positions.

Figure 9:
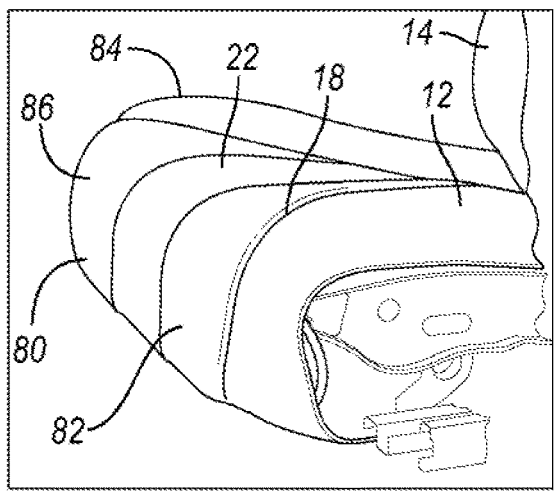
FIG. 9 illustrates the seat assembly with the leg-support assembly of FIG. 1, with both the right and left leg supports shown in a stored position.
Figure 10:
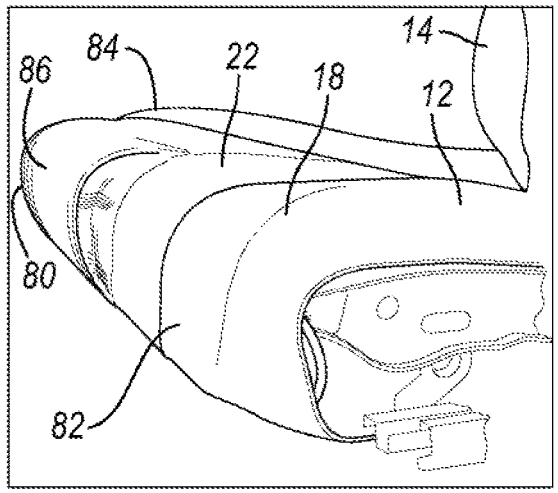
FIG. 10 illustrates the seat assembly with the leg-support assembly of FIG. 1, with the left leg support shown in a stored position and the right leg support shown in a first support position.
Figure 11:
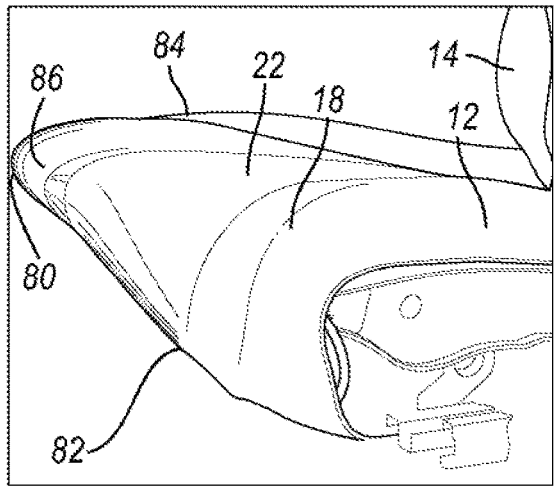
FIG. 11 illustrates the seat assembly with the leg-support assembly of FIG. 1, with the left leg support shown in a stored position and the right leg support shown in a second support position.

FIGS. 9-11 illustrate the adjustable leg-support assembly 20 having a right leg-support assembly 80 and a left-leg-support assembly 82. As shown in the FIGS. 9-11, the right leg-support assembly 80 may be adjustable independent of the left-leg-support assembly 82.

FIG. 9 shows the right and left leg-support assemblies 80, 82 where the bladders are compressed and leg-support assemblies 80, 82 are in a storage position. In this storage position, the leg-support assemblies 80, 82 may be folded adjacent the front surface 66 of the seat frame 64. As shown in FIGS. 9-11, a trim cover 84 may cover the leg-support assemblies 80, 82. The trim cover 84 may have expandable portions or be formed of a material including elastic to allow the cover to stretch as the leg-support assemblies move between the storage position and the support positions.

FIGS. 10-11 show the right leg-support assembly 80 expanding and unfolding to form a right leg-support surface 86 extending from the seating surface 18 without any opening or gaps between the seating surface 18 and leg-support surface 86 so that the seating surface 18 and leg-support surface 86 form a continuous contoured surface.

In FIG. 10, the right leg-support assembly 80 expands to move the leg-support surface 86 at a first angle relative to the front surface 66 of the seat frame 64, or a first leg-support position. The left leg-support assembly 82 is maintained in the storage position. In FIG. 11 the right leg-support assembly 80 expands to move the support surface 86 to a second angle relative to the front surface 66 of the seat frame 64, or a second leg-support position. Again, the left leg-support assembly 82 is maintained in the storage position.

Figure 3:
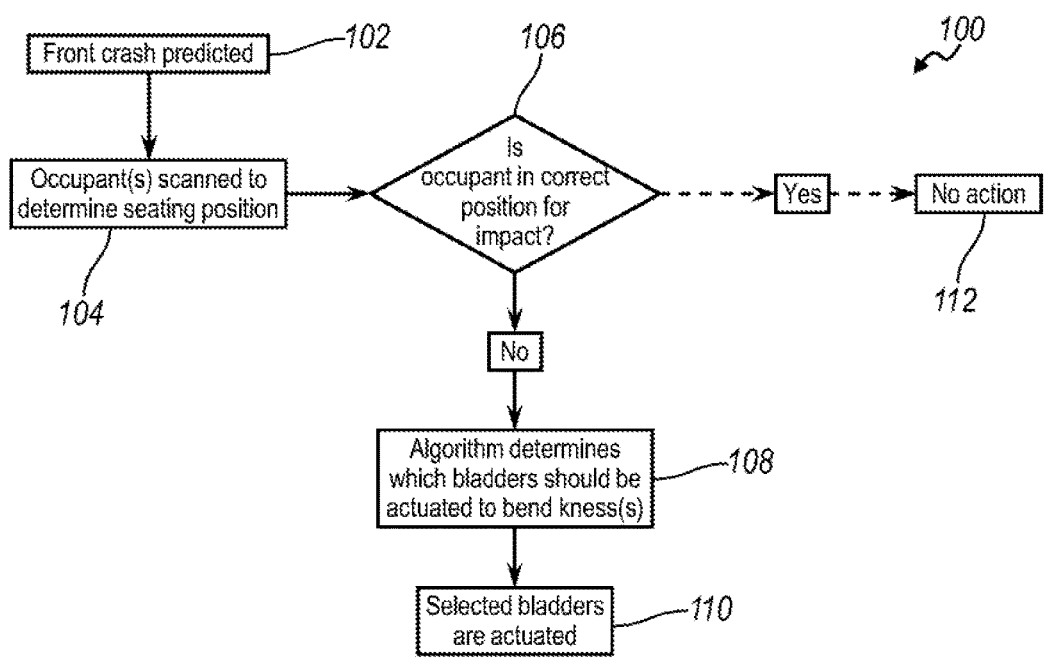
FIG. 3 shows a flow diagram of the method of controlling the seat assembly and leg-support assembly in FIG. 2.

Returning to FIGS. 3 and 5, the method of adjusting the leg-support assemblies in advance of a crash is described in more detail. FIG. 3 illustrates the flow chart describing the method 100 for adjusting the leg-support assemblies in advance of a front crash. If a front crash is predicted, as in block 102, in block 104, the occupants are scanned to determine their seating position. The occupants maybe scanned by internal cameras, sensors and other sensing devices or systems.

In block 106, the controller determines if the occupant is in the correct position for front impact. The controller may compare the occupant's sensed position to an ideal front impact position. The controller may also compare the occupant's position to the pedals, steering wheel, or other possible objects and structures.

If the occupant is not in the correct position, the controller determines which bladders in the leg-support assemblies should be actuated to bend the occupant's legs, as shown in block 108. An algorithm may determine the correct shin-tibia angle based on the occupant's scanned data, anthropometric dimensions, or other inputs. The algorithm may also determine what combination of bladders, or arrays of bladders would position the occupant's legs at the correct angle being more bent than a typical seated position.

At block 110, the controller actuates the bladders to move the leg-support assemblies to the front crash support position. The bladders may be expanded by a pump, stored air under pressure, or release of vacuum that expands compressed foam, or any other suitable actuation devices. If the occupant is in the correct position, the controller may not actuate any bladders or move the leg-support assemblies, even if a front crash is predicted, as shown at block 112.

Figure 5:
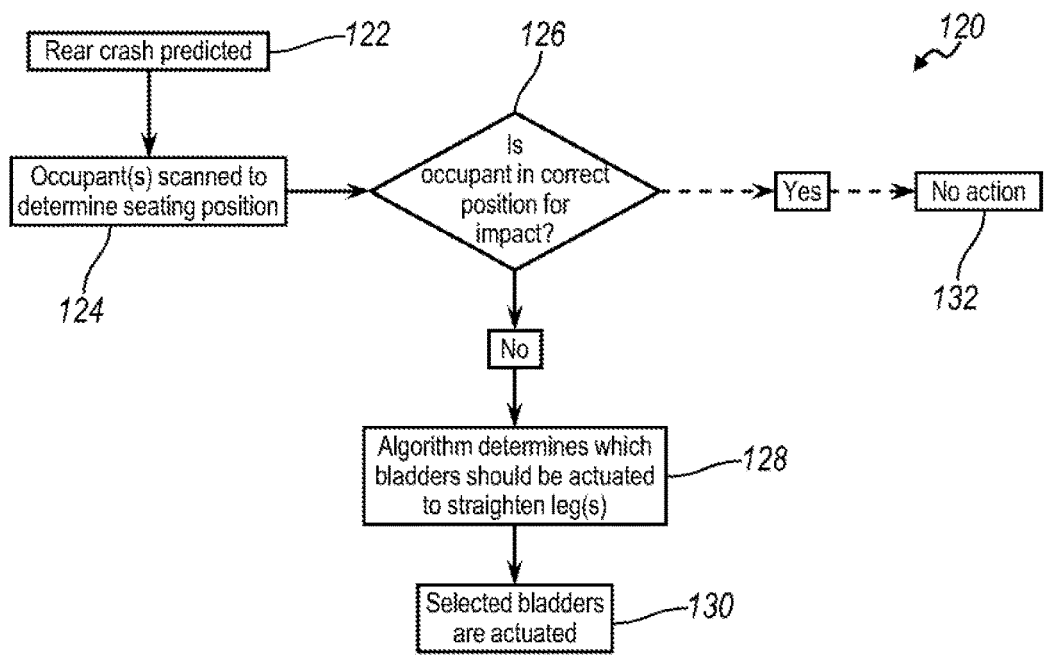
FIG. 5 shows a flow diagram of the method of controlling the seat assembly and leg-support assembly in FIG. 4.

FIG. 5 illustrates the flow chart describing the method 120 for adjusting the leg-support assemblies in advance of a rear crash. If a rear crash is predicted, as in block 122, in block 124, the occupants are scanned to determine their seating position.

In block 126, the controller determines if the occupant is in the correct position for rear impact. If the occupant is not in the correct position, the controller determines which bladders in the leg-support assemblies should be actuated to straighten the occupant's legs, as shown in block 128. An algorithm may determine the correct shin-tibia angle and may also determine what combination of bladders, or arrays of bladders would position the occupant's legs at the correct angle being straighter than a typical seated position.

At block 130, the controller actuates the bladders to move the leg-support assemblies to the rear crash support position. If the occupant is in the correct position, the controller may not actuate any bladders or move the leg-support assemblies, even if a rear crash is predicted, as shown at block 132.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom defining a seating surface;
   an adjustable leg-support assembly having a support surface adapted to extend from a forward surface of the seat bottom and at least one bladder mounted to the seat bottom and filled with a compressible material, the bladder expandable to move the support surface between a storage position and at least one leg-support position;
   a valve in fluid communication with the at least one bladder; and
   a vacuum pump in fluid communication with the valve, wherein, the compressible material is compressed under vacuum pressure generated by the vacuum pump when the valve is closed in the storage position, and
   wherein the compressible material is expanded when the valve is open to move the at least one bladder to the leg-support position; and
   a controller in communication with the valve and programmed to:
      receive a signal indicating a potential impact; and
      in response to the signal of the potential impact, command the valve to open to the atmosphere and thereby rapidly expand the compressible material and bladder and move the support surface to at least one leg-support position relative to the seating surface.

2. The seat assembly of claim 1, wherein the adjustable leg-support assembly is configured to vary an angle between the support surface and a seating surface of the seat bottom during in response to the potential impact, wherein the compressible material comprises a compressible foam, wherein the at least one bladder comprises a first bladder and a second bladder,
   wherein the foam in the first bladder is expanded to a first leg-support position where a support surface is moved to a first angle relative to a seating surface, and
   wherein the foam in the second bladder is expanded to a second leg-support position where a support surface is moved to a first angle relative to a seating surface.

3. The seat assembly of claim 2, wherein the controller is programmed to:
   command the valve to open to the atmosphere for the first bladder and thereby expand the first bladder to the first leg-support position adapted to bend the occupant's knees based on the detected seating position if the impact signal indicates front impact; and
   command the valve to open to the atmosphere for the second bladder and thereby expand the second bladder to second leg-support position adapted to straighten the occupant's knees based on the detected seating position if the impact signal indicates the rear impact.

4. The seat assembly of claim 1, wherein the at least one bladder comprises a right bladder and a left bladder, wherein the right bladder and left bladder are independently operable and adapted to provide support for a right occupant leg and a left occupant leg independently.

5. The seat assembly of claim 1, wherein the at least one bladder comprises a plurality of bladders,
   wherein the compressible material in a first combination of the plurality of bladders is expanded to a first leg-support position, and
   wherein compressible material in a second combination of the plurality of bladders is expanded to a second leg-support position.

6. A seat assembly comprising:
   a seat bottom defining a seating surface;
   an adjustable leg-support assembly having a support surface extending from a forward portion of the seat bottom and defining a forward surface of the seat bottom when the adjustable leg-support assembly is in a storage position, comprising:
      a first bladder array having a first plurality of bladders angularly expandable to move the support surface to a first leg-support position where the support surface is at a first angle relative to the seating surface; and
      a second bladder array having a second plurality of bladders angularly expandable to move the support surface to a second leg-support position where the support surface is at a second angle relative to the seating surface.

7. The seat assembly of claim 6, wherein the seat bottom has a seat frame, and wherein the first and second bladder arrays are positioned between a front surface of the seat frame and an extendable support surface.

8. The seat assembly of claim 6, wherein the adjustable leg-support assembly comprises a right leg-support assembly and a left leg-support assembly, wherein the right leg-support assembly is adjustable independent of the left leg-support assembly.

9. The seat assembly of claim 6, wherein the adjustable leg-support assembly further comprises an actuator in communication with the adjustable leg-support assembly to expand the first and second bladder arrays.

10. The seat assembly of claim 9 further comprising:
a controller in communication with the actuator and programmed to:
receive an impact signal indicating a potential impact; and
command the actuator to expand the one of the first and second bladder arrays to at least one of the first and second leg-support positions based on the impact signal.

11. The seat assembly of claim 9, wherein the actuator comprises a valve assembly configured to open to atmosphere and expand a vacuum compressed foam disposed in the bladders when the actuator is activated.

12. The seat assembly of claim 9, wherein the actuator comprises a pump configured to inflate the bladders with air when the actuator is activated.

13. The seat assembly of claim 9, wherein the controller is programmed to:
command the valve to open to the atmosphere for the first bladder array and thereby expand the first bladder array to the first leg-support position adapted to bend the occupant's knees based on the detected seating position if the impact signal indicates front impact; and
command the valve to open to the atmosphere for the second bladder array and thereby expand the second bladder array to second leg-support position adapted to straighten the occupant's knees based on the detected seating position if the impact signal indicates the rear impact.

14. A method comprising:
providing a plurality of bladders each filled with a compressible foam and mounted along a forward portion of a seat bottom;
receiving an impact signal indicative of a potential impact;
commanding an actuator to expand the foam in a first combination of the plurality of bladders to a first leg-support position if the impact signal indicates a front impact; and
commanding the actuator to expand the foam in a second combination of the plurality of bladders to a second leg-support position if the impact signal indicates a rear impact.

15. The method of claim 14, wherein commanding the actuator comprises commanding a valve to open to the atmosphere and expand the foam compressed under vacuum.

16. The method of claim 14, further comprising:
detecting a seating position of the occupant;
determining if the occupant seating position is correct for the potential impact;
if the occupant seating position is not correct, commanding the actuator to expand the foam in one of the first and second combinations.

17. The method of claim 14, further comprising:
detecting a seating position of the occupant;
commanding an actuator to expand the foam in a least the first combination to the first leg-support position adapted to bend the occupant's knees based on the detected seating position if the impact signal indicates front impact; and
commanding the actuator to expand the foam in a least the second combination of bladders to the second leg-support position adapted to straighten the occupant's knees based on the detected seating position if the impact signal indicates the rear impact.

18. The method of claim 17, further comprising:
commanding an actuator to angularly expand the foam to the first leg-support position having a first angle relative to a seating surface of the seat bottom to bend the occupant's knees if the impact signal indicates the front impact; and
commanding the actuator to angularly expand the foam to the second leg-support position having a second angle relative to a seating surface to straighten the occupant's knees based if the impact signal indicates the rear impact.

19. The method of claim 14, further comprising:
deflating the bladders with a vacuum pump if a front or rear impact does not occur.

* * * * *